(12) United States Patent
Zhang et al.

(10) Patent No.: US 6,442,188 B1
(45) Date of Patent: Aug. 27, 2002

(54) PHASE LOCKED LOOP

(75) Inventors: Michael T. Zhang, Portland; Don Weiss, Beaverton, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/119,111

(22) Filed: Jul. 20, 1998

(51) Int. Cl.[7] .................................. H04K 7/00
(52) U.S. Cl. ........................ 375/130; 331/23; 375/376; 327/156
(58) Field of Search ................ 375/371, 373, 375/376, 149, 130–152, 367; 327/147, 141, 156; 370/503, 515, 516; 331/23

(56) References Cited

U.S. PATENT DOCUMENTS

| | | | | |
|---|---|---|---|---|
| 5,414,741 A | * | 5/1995 | Johnson | 375/376 |
| 5,488,627 A | | 1/1996 | Hardin et al. | 375/204 |
| 5,506,545 A | * | 4/1996 | Andrea | 331/78 |
| 5,631,920 A | * | 5/1997 | Hardin | 375/204 |
| 5,822,011 A | * | 10/1998 | Rumreich | 348/549 |
| 5,867,524 A | * | 2/1999 | Booth et al. | 375/200 |
| 5,872,807 A | * | 2/1999 | Booth et al. | 375/200 |
| 5,909,144 A | * | 6/1999 | Pukette et al. | 327/551 |
| 6,046,646 A | * | 4/2000 | Lo et al. | 331/10 |
| 6,046,735 A | * | 4/2000 | Bassetti et al. | 345/204 |

OTHER PUBLICATIONS

Keith B. Hardin, et al., "Design Considerations of Phase–Locked Loop Systems for Spread Spectrum Clock Generation Compatibility" pp. 1–6, presented at the 1997 IEEE International Symposium on Electromagnetic Compatibility, Austin, TX, Aug. 18–22.

Andrew Volk, et al., "Notes on AGP Interface Architectures and Motherboard Design with SSC", pp. 1–7, Feb. 1998.

* cited by examiner

*Primary Examiner*—Jean Corrielus
(74) *Attorney, Agent, or Firm*—Trop, Pruner & Hu, P.C.

(57) ABSTRACT

A method includes locking onto a spread spectrum clock signal to minimize a phase error between an output clock signal and the spread spectrum clock signal. The spread spectrum clock signal has a time-varying frequency that cycles at a modulation frequency. The method includes minimizing a phase angle between spectral components of the output and spread spectrum clock signals near the modulation frequency. In some embodiments, the method may be performed by a phase locked loop.

28 Claims, 5 Drawing Sheets

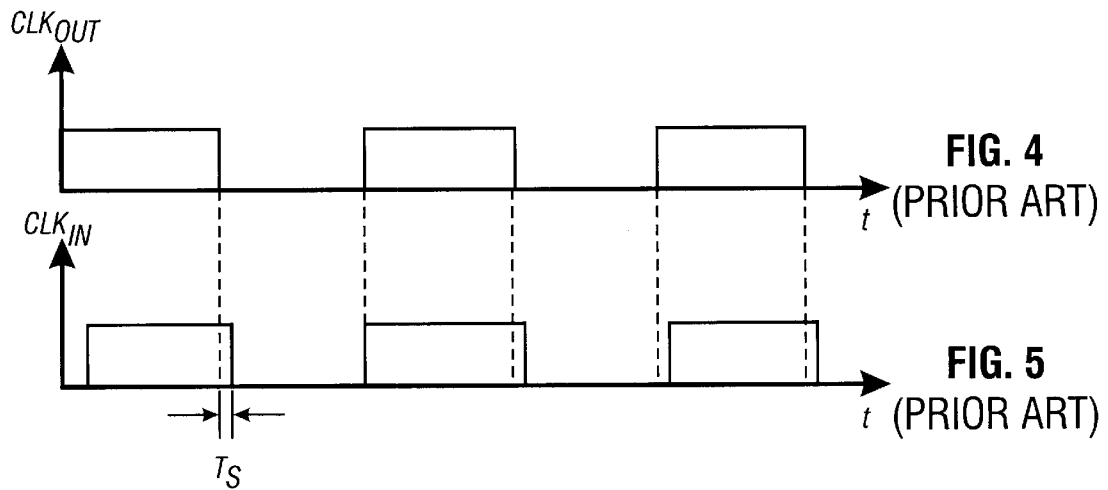
FIG. 4 (PRIOR ART)
FIG. 5 (PRIOR ART)
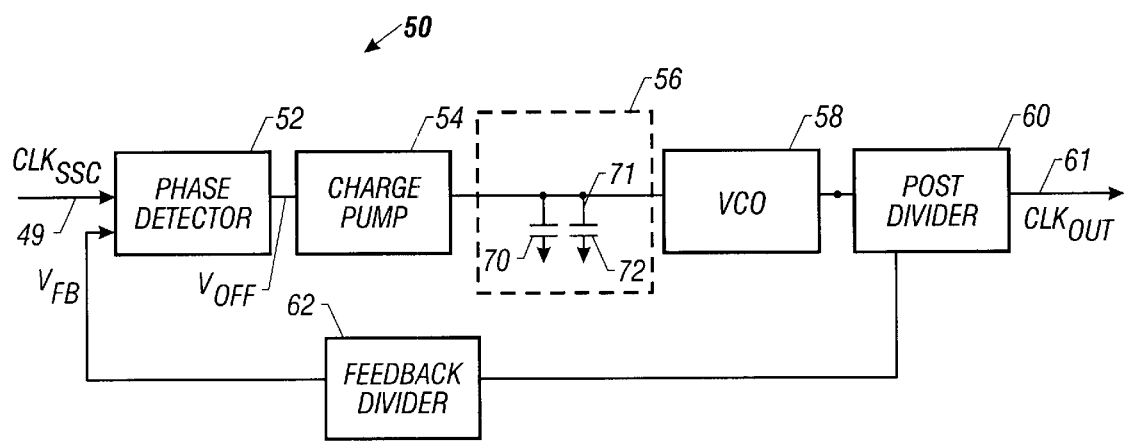
FIG. 7

PHASE LOCKED LOOP

BACKGROUND

The invention relates to a phase locked loop.

A typical computer system uses clock signals to synchronize operations of digital circuitry of the system. Unfortunately, spectral components of these clock signals may radiate electromagnetic interference (EMI) emissions. For example, referring to FIG. 1, the spectral components of a clock signal might include a spectral component 10 that is located at a fundamental frequency (called $f_O$ and may be, for example, 100 MHz) of the signal as well as spectral components 12 that are located at harmonic frequencies (i.e., frequencies located at multiples of the $f_O$ frequency).

The EMI emissions may cause undesirable interference with the circuitry of the computer system and other electronic equipment near the computer system. To reduce the EMI emissions, the circuitry of the computer system may be housed inside a metal casing which prevents the EMI emissions from propagating outside of the casing. However, the casing often adds to the weight and cost of the computer system, and the casing has a limited shielding capability.

In addition to the casing, the EMI emissions may be further reduced by spread spectrum clocking (SSC) which reduces the energy peaks present in the spectral components of the clock signal. In SSC, a spread spectrum clock signal (called $CLK_{IN}$ (see FIG. 2)) may be generated by an SSC generator 14. To accomplish this, the SSC generator 14 might receive a signal (from a reference generator 13) which indicates a nominal fundamental frequency (called $f_{NOM}$) for the $CLK_{IN}$ signal. The SSC generator 14 uses the $f_{noM}$ frequency to generate the $CLK_{IN}$ signal which has, in place of a constant fundamental frequency, a time-varying frequency (called $f_{SSC}$ (see FIG. 3)) that deviates slightly (within 1 MHz, for example) about the $f_{NOM}$ frequency. As a result of the modulation of the fundamental frequency, spectral components 18 (see FIG. 1) of the $CLK_{IN}$ clock signal have typically smaller magnitudes than the corresponding spectral components 10 and 12 of the traditional clock signal, and as a result, the $CLK_{IN}$ signal typically generates fewer EMI emissions.

Referring to FIG. 3, over one cycle, the $f_{SSC}$ frequency may deviate about the $F_{NOM}$ frequency between a minimum frequency (called $f_L$) and a maximum frequency (called $f_H$). The $f_{SSC}$ frequency may, for example, resemble a sawtooth waveform 5 or may resemble a linear and cubic combination 7 of the sawtooth waveform 5. The frequency at which the $f_{SSC}$ frequency cycles is often called an SSC modulation frequency (called $f_M$) of the $CLK_{IN}$ signal and may be higher than audio frequencies (20 Hz to 20 kHz frequencies) but significantly lower than the $F_{NOM}$ frequency. As examples, the $f_M$ frequency might be near 33 kHz, and the $F_{NOM}$ frequency might be near 100 MHz.

Referring back to FIG. 2, phase locked loops (PLLs) are often used to regenerate clock signals to minimize the effects of parasitic impedances of transmission lines that are used to communicate the clock signals. In this manner, a PLL 15 may receive and lock onto the $CLK_{IN}$ signal to generate another spread spectrum clock signal (called $CLK_{OUT}$) that might ideally be a duplicate of the $CLK_{IN}$ signal.

However, referring to FIGS. 4 and 5, the $CLK_{OUT}$ signal is typically not an exact duplicate of the $CLK_{IN}$ signal but instead, may lead or lag the $CLK_{OUT}$ signal in time by a phase error, or clock skew (called $T_S$). For purposes of the following description, the clock skew $T_S$ is defined as an interval of time in which the $CLK_{IN}$ signal undesirably leads the $CLK_{OUT}$ signal and might assume a negative (when the $CLK_{IN}$ signal lags the $CLK_{OUT}$ signal) or a positive (when the $CLK_{IN}$ signal leads the $CLK_{OUT}$ signal) value.

As an example, one SSC modulation cycle, the $f_{SSC}$ frequency (see FIG. 3) periodically decreases (during time $T_1$ to time $T_2$, for example) from the $f_H$ to the $f_L$ frequency to produce a resultant skew $T_S$ 20 (see FIG. 6) that approaches a large negative value (a value near –1000 picoseconds (ps), for example). Thus, during this time interval, the $CLK_{IN}$ signal may lag the $CLK_{OUT}$ signal due to the decrease in frequency. Once the $f_{SSC}$ frequency reaches the $f_L$ frequency (at time $T_2$, for example) and then abruptly changes course and rises upwardly (after time $T_2$, for example) toward the $f_H$ frequency, the skew $T_S$ 20 may approach a large positive value (1000 ps) due to the increase in frequency and the PLL's temporary over compensation.

One way to decrease the skew is to increase the response speed of the PLL 15, and one way to increase the response speed of the PLL 15 is to increase the PLL's bandwidth. For example, the large skew $T_S$ 20 may occur when the PLL 15 has a relatively low bandwidth (a bandwidth of 440 kHz, for example), but when the PLL 15 has a larger bandwidth (a bandwidth of 1.2 MHz, for example), a resultant skew $T_S$ 21 (see FIG. 6) may be much smaller (the skew $T_S$ may deviate between 140 and –140 ps, as an example). However, even with this reduction, the skew $T_S$ 21 may not be sufficient to satisfy timing requirements of the computer system.

Thus, there is a continuing need for an arrangement to reduce the skew of such a system.

SUMMARY

In one embodiment, a method includes locking onto a phase of a spread spectrum clock signal to minimize a phase error between an output clock signal and the spread spectrum clock signal. The spread spectrum clock signal has a time-varying frequency that cycles at a modulation frequency, and the spread spectrum and output clock signals are approximately separated by the phase error. The method includes minimizing a phase angle between spectral components of the output and spread spectrum clock signals near the modulation frequency.

In another embodiment, a phase locked loop minimizes a phase error between a spread spectrum clock signal and an output clock signal. The phase locked loop includes a detector and a filter. The detector receives a spread spectrum clock signal and compares the spread spectrum clock signal with an output signal. The spread spectrum clock signal has a time-varying frequency that cycles at a modulation frequency. The filter is coupled to the detector to minimize a phase angle between spectral components of the output and spread spectrum clock signals near the modulation frequency.

BRIEF DESCRIPTION OF THE DRAWING

FIGS. 4 and 5 are waveforms of the clock signals of the system of FIG. 2.

FIG. 7 is a block diagram of a phase locked loop according to an embodiment of the invention.

DETAILED DESCRIPTION

Figure 1:
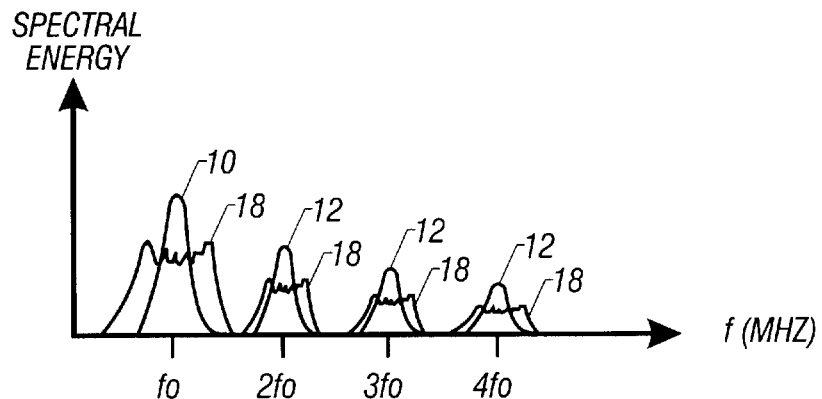
FIG. 1 is a graph of spectral energies of different clock signals.
Figure 2:
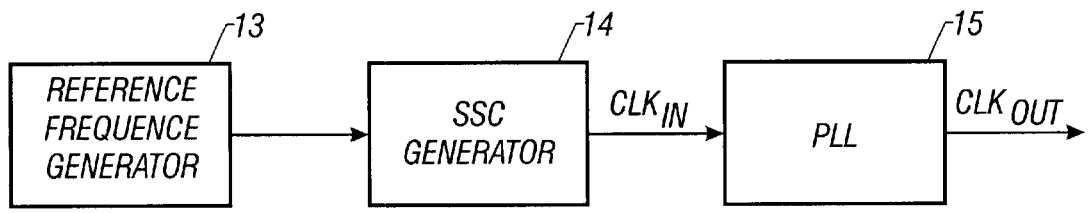
FIG. 2 is a block diagram of a system of the prior art that uses a spread spectrum clock signal.
Figure 3:
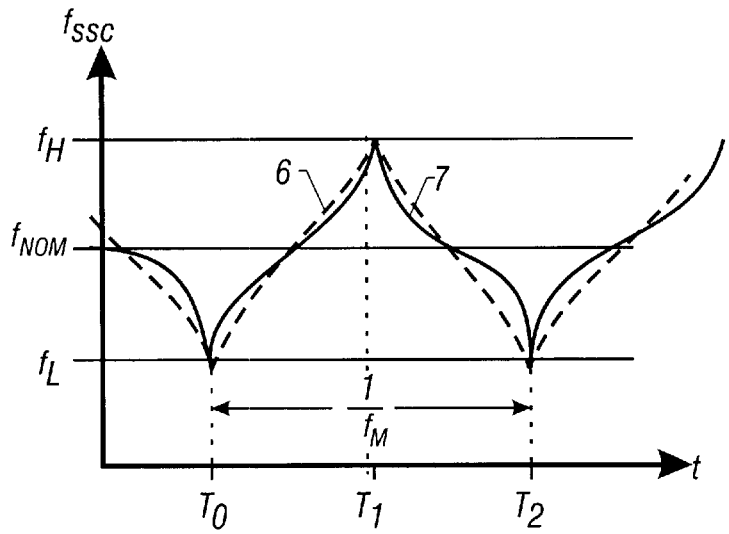
FIG. 3 is a graph illustrating a time-varying frequency of the spread spectrum clock signal.
Figure 6:
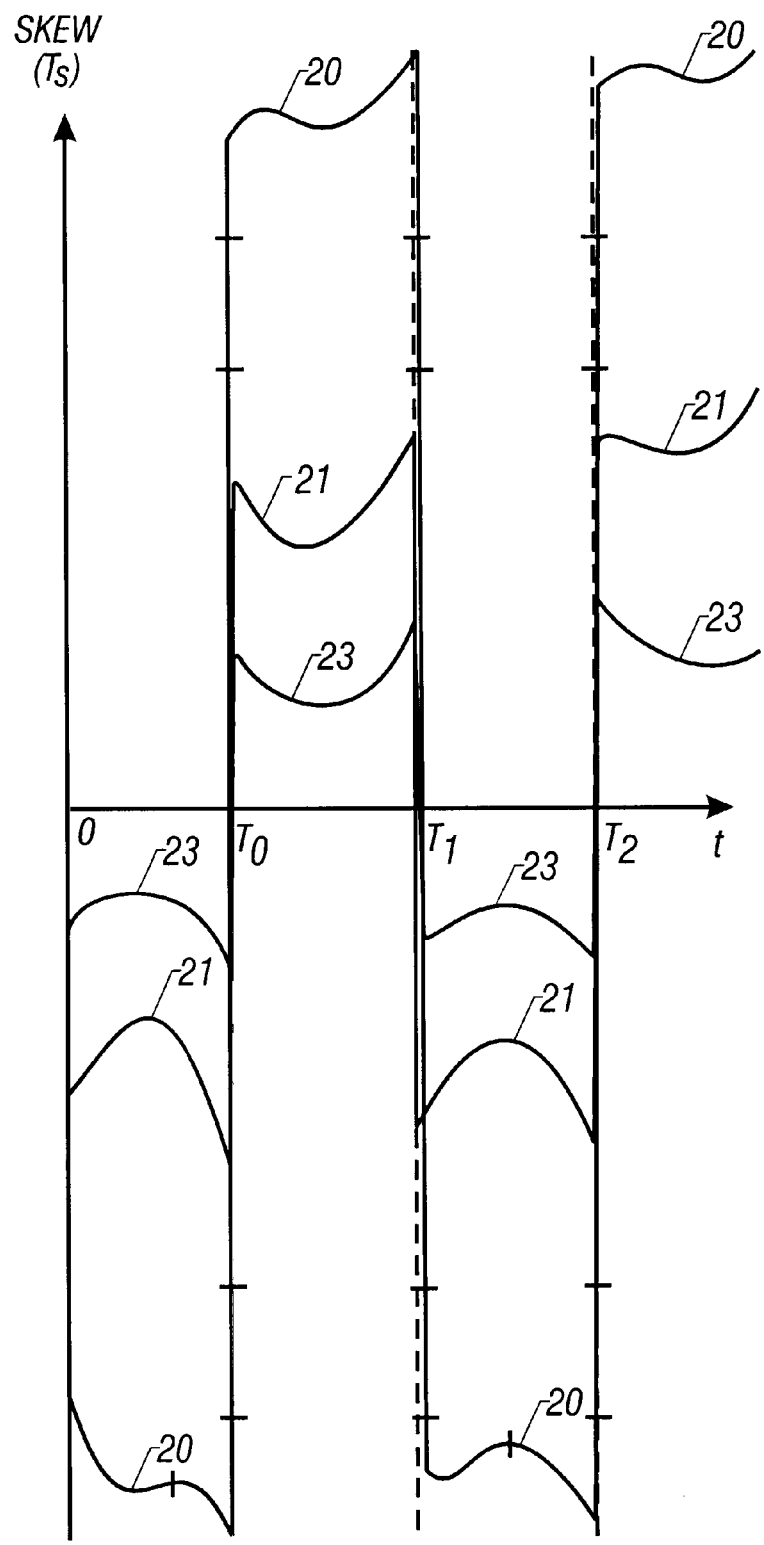
FIG. 6 are illustrations of exemplary skews versus time for clock signals that are generated by different phase locked loops.

Referring to FIG. 7, an embodiment 50 of a phase locked loop (PLL) in accordance with the invention receives a spread spectrum clock signal (called $CLK_{SSC}$) that includes a time-varying main frequency component that cycles about a nominal clock frequency (a frequency greater than approximately 30 MHz, for example) at a modulation frequency (called $f_M$ and may be, as an example, approximately equal to 33 kHz). In response to the $CLK_{SSC}$ signal, the PLL 50 furnishes an output signal (called $CLK_{OUT}$) that ideally has the same phase as the $CLK_{SSC}$ signal. However, actually, the $CLK_{SSC}$ signal may lead or lag the $CLK_{OUT}$ signal by a phase error, or skew (called $T_S$). To minimize the skew $T_S$, the PLL 50 may be designed to maximize a loop bandwidth (called $f_B$) of the PLL 50, and the PLL 50 may be designed to take advantage of a discovery that the skew $T_S$ otherwise introduced by the PLL 50 may be minimized by minimizing phase angle shifts that are introduced by the PLL 50 to spectral components of the $CLK_{SSC}$ signal. In particular, these spectral components are located near the $f_M$ modulation frequency of the $CLK_{SSC}$ signal. Referring to FIG. 6, as an example, because of these skew reduction techniques (described more fully below), the PLL 50 may impart a skew $T_S$ 23 (a skew that varies between 70 and −70 ps, as an example) that is substantially less than the skews $T_S$ 20 and 21 introduced by conventional PLLs.

The advantages of minimizing the skew of a spread spectrum clock signal may include one or more of the following: EMI emissions may be reduced while satisfying system timing requirements; existing systems may be easily upgraded; minimal costs may be required; and minimal semiconductor die area may be consumed.

The $T_S$ skew may be in part attributable to a limited feedback loop bandwidth (of the PLL 50) which prevents the PLL 50 from instantaneously updating the $CLK_{OUT}$ clock signal as the frequency of the $CLK_{SSC}$ signal varies. SSC modulation profiles, except for sinusoidal modulation, contain higher-order harmonic contents other than that of the fundamental modulation frequency. In this manner, in order to accurately track the sudden change of the input frequency, the PLL 50 must have a sufficiently large $f_B$ loop bandwidth to track all the essential modulation harmonics. A loop gain of the PLL 50, which measures a gain from the $CLK_{SSC}$ signal to a feedback signal (called $V_{FB}$) of the PLL 50, is effectively set by a filter circuit 56 (a second order low pass filter, for example, as shown). This loop gain is described by the following equation:

$$T(s) = \frac{I_{CP}}{S} \cdot \left( \frac{1}{sC_1} \cdot \frac{s + \frac{1}{R \cdot C_2}}{s + \frac{C_1 + C_2}{R \cdot C_1 \cdot C_2}} \right) \cdot G_{VCO} \cdot \frac{1}{N_{FB}},$$

where $I_{CP}$ is a current of a charge pump circuit 54, $G_{VCO}$ is a gain of a voltage controlled oscillator (VCO) 58, and $N_{FB}$ is a ratio set by a feedback divider circuit 62. Given these parameters, the $f_B$ loop bandwidth may be determined numerically by solving the equation $$|T(F_B)|=1(0 \text{ dB}).$$

In addition to maximizing the $f_B$ loop bandwidth to reduce the $T_S$ skew, the phase angle shifts that are introduced by the PLL 50 to spectral components of the $CLK_{SSC}$ signal near the $f_M$ modulation frequency may be minimized to reduce the $T_S$ skew. To accomplish this, the input-to-output transfer function of the PLL 50 is manipulated. This transfer function is described by the following equation:

$$H(s) = \frac{I_{CP} \cdot G_{VCO}}{N_{FB} \cdot C_1} \cdot \frac{s + \frac{1}{R \cdot C_2}}{s^3 + s^2 \cdot \frac{C_1 + C_2}{R \cdot C_1 \cdot C_2} + s \cdot \frac{I_{CP} \cdot G_{VCO}}{N_{FB} \cdot C_1} + \frac{I_{CP} \cdot G_{VCO}}{N_{FB} \cdot R \cdot C_1 \cdot C_2}}.$$

The phase shift introduced by the PLL 50 at the $f_M$ modulation frequency may be determined numerically as the angle of $H(s)$ at the $f_M$ modulation frequency, as described by the following equation:

$$\theta = \phi(H(j \cdot 2\pi F_m)),$$

where j is the complex suffix.

In some embodiments, the low pass filter 56 may include, for example, a capacitor 70 that is coupled from an output terminal of the charge pump 54 to ground. A resistor 71 of the filter 56 is coupled between the output terminal of the charge pump 54 and one terminal of a capacitor 72. The other terminal of the capacitor 72 is coupled to ground.

The resistance(s) and capacitance(s) for the filter 56 are chosen to select the frequency responses for the PLL 50, as described above. In some embodiments, the low pass filter 56 may be structured the same as low pass filters of the conventional PLLs, with the exception that the resistance and capacitance values may be changed to reduce the phase angle shifts near the $f_M$ modulation frequency. For example, in some embodiments, the capacitance of the capacitor 72 may itself be chosen to impart the desired frequency response. For example, the capacitor 72 of a conventional PLL might have a capacitance of 350 picofarads (pf) to set the phase angle 74 of the conventional PLL to 0.250° at the $f_M$ modulation frequency. In contrast, as an example, in the PLL 50, the capacitance of the capacitor 72 may be changed from 350 pf to 36 pf to set the phase angle 76 of the PLL 50 to 0.003° at the $f_M$ modulation frequency.

Figure 8:
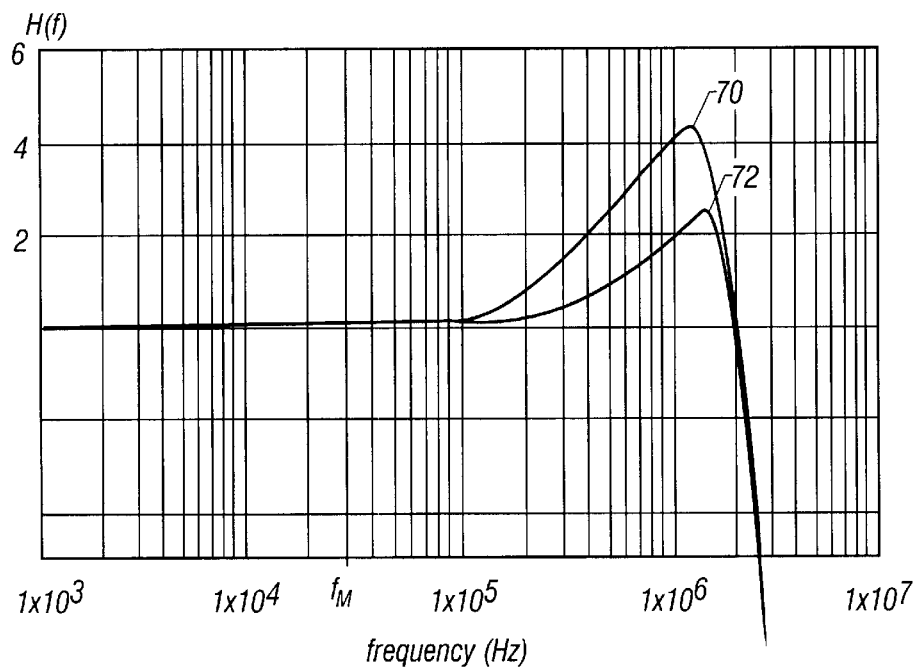
FIGS. 8, 9, 10, and 11 are illustrations of frequency characteristics of the phase locked loop of FIG. 7.
Figure 9:
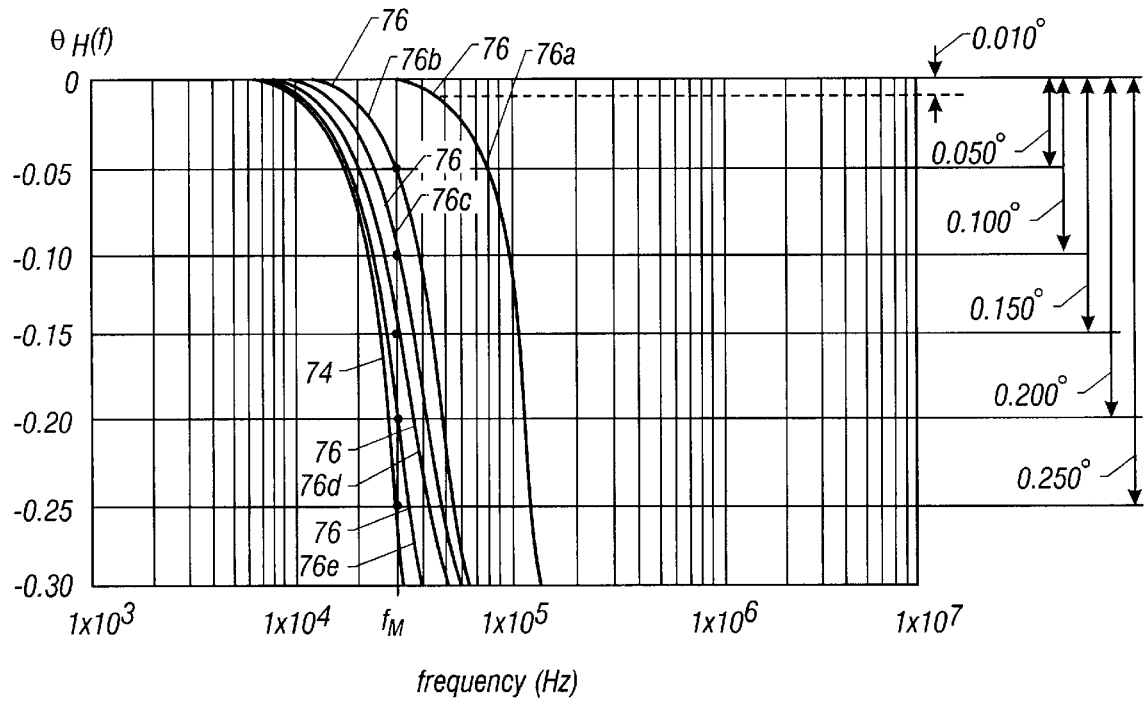

The phase shift that the PLL 50 imparts to the $CLK_{SSC}$ signal may be represented by a frequency response (measured between its input 49 and output 61 terminals) of the PLL 50. In this manner, the PLL 50 has a frequency response that may be represented by a magnitude 70 (see FIG. 8) and a phase angle 76 (phase angles 76a, 76b, 76c, 76d and 76e for different embodiments of the PLL 50, are shown in FIG. 9), both of which are functions of frequency. The phase angle 76 represents the amount of phase shift that is introduced by the PLL 50 and is to be compared to a phase angle 74 (see FIG. 9) of a conventional PLL.

In the conventional PLL, for stability reasons, the phase angle 74 is typically designed to be substantially away (at least 0.250° away, for example) from zero degrees near the $f_M$ modulation frequency. Thus, the conventional PLL typically shifts the spectral components (of the $CLK_{SSC}$ signal) that are near the $f_M$ modulation frequency by a substantial amount.

The phase shift introduced by the conventional PLL is to be contrasted to the phase shift introduced by the PLL 50 where some stability of the PLL 50 might be traded for skew reduction. In this manner, the phase angle 76 of the PLL 50 stays substantially close to zero degrees near the $f_M$ modulation frequency and might decrease rapidly for frequencies substantially above the $f_M$ modulation frequency. In some embodiments, the skew may be minimized without decreasing the stability of the PLL 50.

In different embodiments, the phase angle 76 might be approximately within 0.010° (for the phase angle 76a), 0.050° (for the phase angle 76b), 0.100° (for the phase angle 76c), 0.150° (for the phase angle 76d) or 0.200° (for the phase angle 76e) of zero degrees near the $f_M$ modulation frequency.

Figure 11:
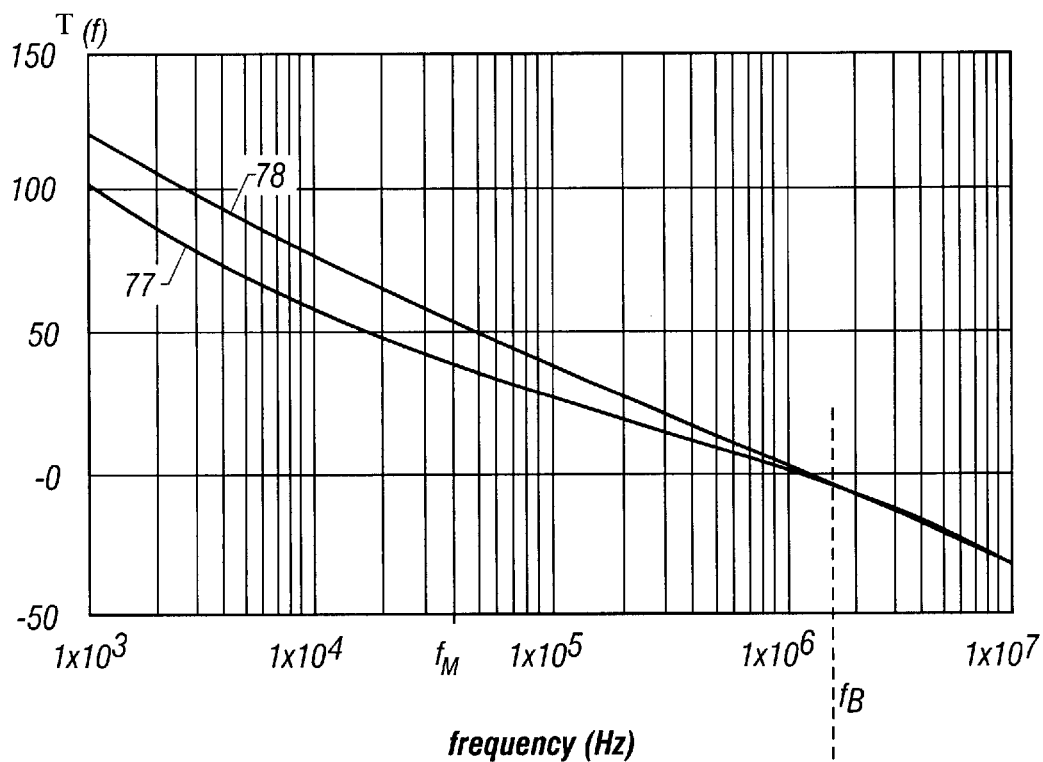
Figure 10:
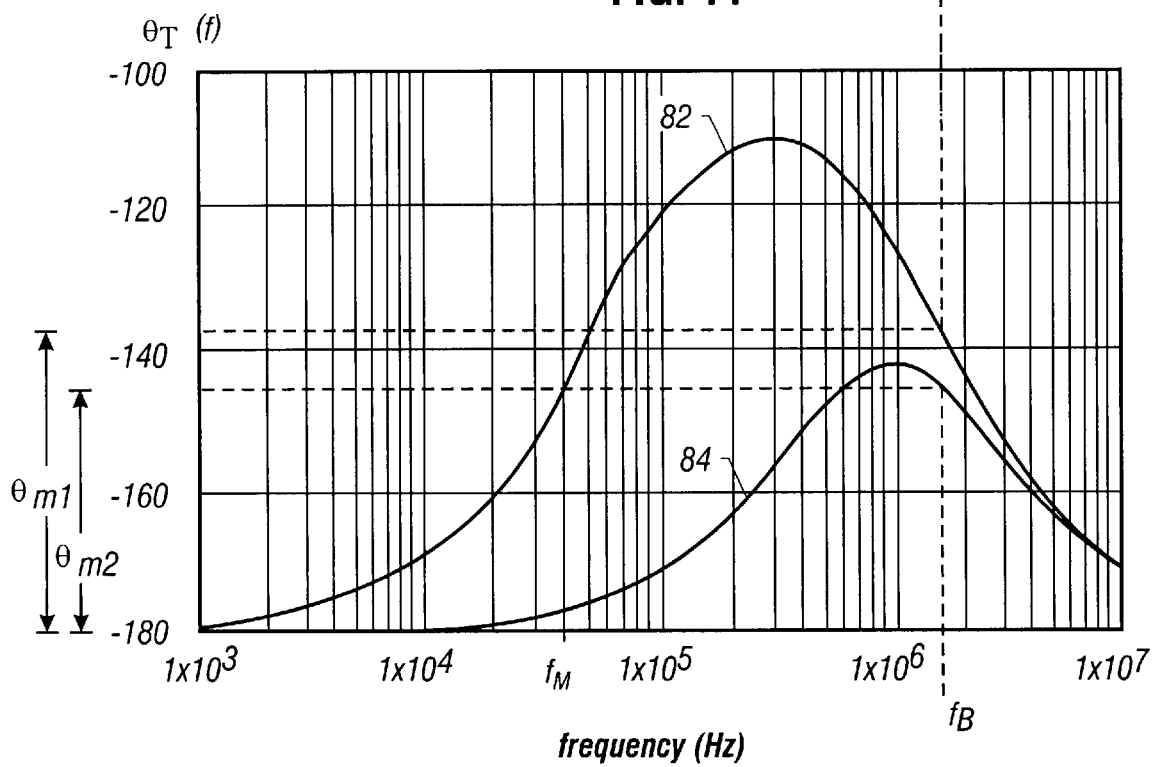

In some embodiments, the skew reduction may result in a decrease in a phase margin (called $\theta_M$), a parameter that may be used to indicate a stability of a PLL. In this manner, a larger phase margin $\theta_M$ typically means more stability. The phase margin $\theta_M$ may be evaluated by observing a magnitude (called T(f) (see FIG. 11)) and phase angle (called $\theta_T(f)$ (see FIG. 10)) of a loop gain of the PLL. In this manner, the phase margin $\theta_M$ is typically defined as the difference between 180° and the phase angle $\theta_T(f)$ evaluated at the frequency at which the T(f) magnitude approaches 0 decibels (dB). For example, a conventional PLL might have a T(f) magnitude 77 that approaches 0 dB at the $f_B$ frequency. At the $f_B$ frequency, a $\theta_T(f)$ phase angle 82 (see FIG. 10) may approach −135°, and as a result, a phase margin (called $\theta_{M1}$) may be approximately 45°. In contrast, a phase margin (called $\theta_{M2}$) for the PLL 50 (measured from a phase angle 84 at the frequency $f_B$ where a T(f) magnitude 78 approaches 0 dB) may be approximately 35°. The loop gain of the PLL 50 is the gain from the $CLK_{SSC}$ signal to a feedback signal (called $V_{FB}$ (see FIG. 7)). Thus, as a lesser phase margin generally means less stability, stability of the PLL 50, in some embodiments, may be traded for skew reduction.

Referring back to FIG. 7, in some embodiments, the PLL 50 includes a phase detector 52 which compares the phases of the $CLK_{SSC}$ and the $V_{FB}$ feedback signal and provides a difference signal (called $V_{DIFF}$) to the charge pump 54. The charge pump 54 responds to the $V_{DIFF}$ signal to furnish a signal proportional to the phase difference. The low pass filter circuit 56 is coupled to receive the output signal of the charge pump 54 and establish the frequency response of the PLL 50. The VCO 58 receives an output signal that is generated by the low pass filter 56 and in response, ideally generates a clock signal that represents the $CLK_{SCC}$ signal delayed by the predetermined phase difference $\theta_P$. A post divider circuit 60 receives this clock signal, scales the clock signal and furnishes the $CLK_{OUT}$ signal. The feedback divider circuit 62 receives the output signal from the VCO 58, scales the output signal and furnishes the $V_{FB}$ signal.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method comprising:
    locking onto a phase of a spread spectrum clock signal to minimize a phase error between an output clock signal and the spread spectrum clock signal, the spread spectrum signal having a time-varying frequency that cycles at a modulation frequency and the spread spectrum and output clock signals being approximately separated by the phase error; and
    minimizing a phase angle between spectral components of the output and spread spectrum clock signals near the modulation frequency.

2. The method of claim 1, further comprising:
    generating the spread spectrum clock signal.

3. The method of claim 1, wherein the phase angle is approximately 0.010 degrees.

4. The method of claim 1, wherein the phase angle is approximately 0.050 degrees.

5. The method of claim 1, wherein the phase angle is approximately 0.100 degrees.

6. The method of claim 1, wherein the phase angle is approximately 0.150 degrees.

7. The method of claim 1, wherein the phase angle is approximately 0.200 degrees.

8. The method of claim 1, wherein the clock frequency comprises a frequency greater than approximately 30 MHz.

9. The method of claim 1, wherein the phase angle is minimized relative to a phase angle of zero degrees.

10. The method of claim 1, wherein minimizing the phase angle comprises: minimizing an absolute value of the phase angle.

11. A phase locked loop for minimizing a phase error between a spread spectrum signal and an output clock signal, comprising:
    a detector to receive the spread spectrum clock signal and compare the spread spectrum clock signal with the output signal, the spread spectrum clock signal having a time-varying frequency that cycles at a modulation frequency; and
    a filter coupled to the detector to minimize a phase angle between spectral components of the output and spread spectrum clock signals near the modulation frequency.

12. The phase locked loop of claim 11, wherein the phase angle is approximately 0.010 degrees.

13. The phase locked loop of claim 11, wherein the phase angle is within approximately 0.050 degrees.

14. The phase locked loop of claim 11, wherein the phase angle is approximately 0.100 degrees.

15. The phase locked loop of claim 11, wherein the phase angle is approximately 0.150 degrees.

16. The phase locked loop of claim 11, wherein the phase angle is approximately 0.200 degrees.

17. The phase locked loop of claim 11, wherein the clock frequency comprises a frequency greater than approximately 30 MHz.

18. The phase locked loop of claim 11, wherein the phase angle is minimized relative to a phase angle of zero degrees.

19. The phase locked loop of claim 11, wherein minimizing the filter minimized the phase angle by minimizing an absolute value of the phase angle.

20. A system for minimizing a phase error between a spread spectrum clock signal and an output clock signal, comprising:
    a generator to generate the spread spectrum clock signal having a time-varying frequency that cycles pursuant to a modulation frequency;
    a detector to receive the spread spectrum clock signal and compare the spread spectrum clock signal with the output signal; and
    a filter to minimize a phase angle between spectral components of the output and spread spectrum clock signals near the modulation frequency.

21. The system of claim 20, wherein the phase angle is approximately 0.010 degrees.

22. The system of claim 20, wherein the phase angle is approximately 0.050 degrees.

23. The system of claim 20, wherein the phase angle is approximately 0.100 degrees.

24. The system of claim 20, wherein the phase angle is approximately 0.150 degrees.

25. The system of claim 20, wherein the phase angle is approximately 0.200 degrees.

26. The system of claim 20, wherein the clock frequency comprises a frequency greater than approximately 30 MHz.

27. The system of claim 20, wherein the phase angle is minimized relative to a phase angle of zero degrees.

28. The system of claim 20, wherein minimizing the filter minimizes the phase angle by minimizing an absolute value of the phase angle.

* * * * *